Dec. 12, 1972  D. G. VIKSTROM  3,706,032
CLAMP ON CURRENT DETECTOR
Filed Jan. 16, 1970  4 Sheets-Sheet 1

INVENTOR.
Dennis G. Vikstrom
BY
Paul Fitzpatrick
ATTORNEY

INVENTOR.
Dennis G. Vikstrom
BY
Paul Fitzpatrick
ATTORNEY

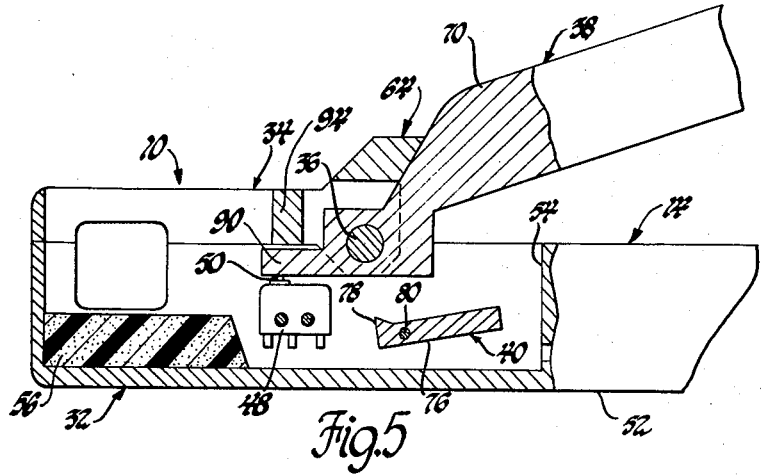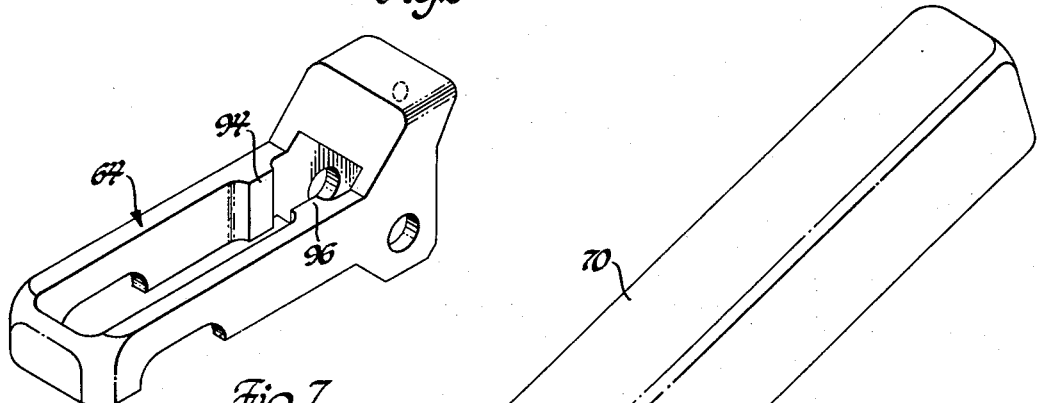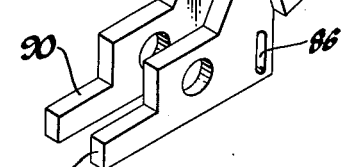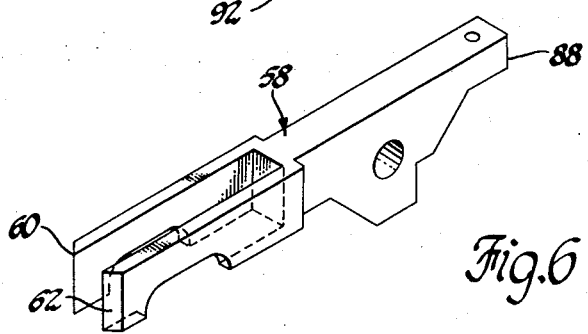

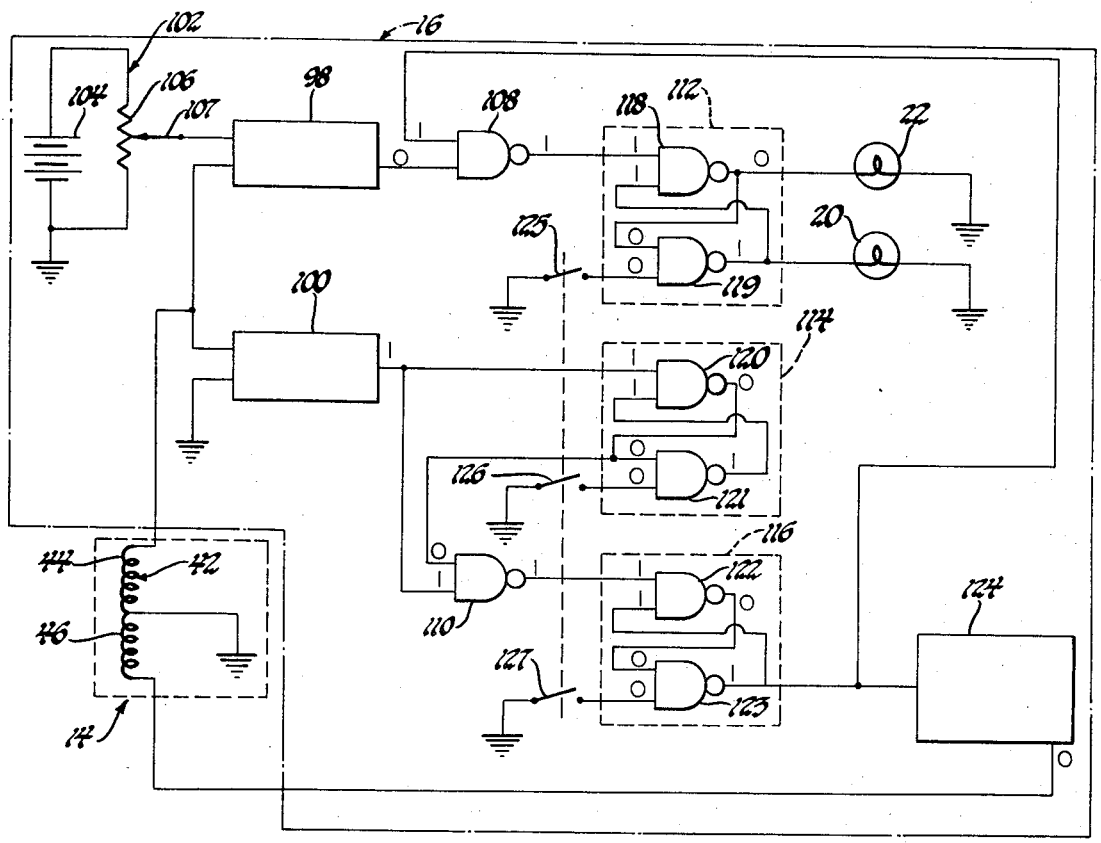
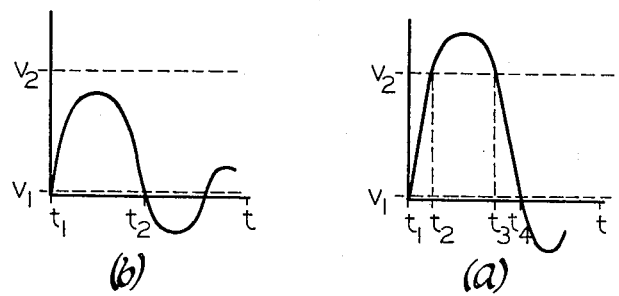
Fig. 9
Fig. 10

United States Patent Office 3,706,032
Patented Dec. 12, 1972

3,706,032
CLAMP ON CURRENT DETECTOR
Dennis G. Vikstrom, Madison Heights, Mich., assignor to General Motors Corporation, Detroit, Mich.
Filed Jan. 16, 1970, Ser. No. 3,361
Int. Cl. G01r 1/22, 33/00
U.S. Cl. 324—127
4 Claims

ABSTRACT OF THE DISCLOSURE

A method and apparatus for measuring DC current in a conductor by surrounding the conductor with a magnetic core having first and second core sections, the second core section being adapted for movement relative to the first core section and normally biased to a certain relative position so as to present a certain reluctance to the magnetic field produced by the current in the conductor. The second core section is moved to a predetermined cocked position then rapidly returned to the certain position so as to rapidly change the magnetic flux in the magnetic core. The magnetic flux change is sensed by a sensing coil and provides an indication of the current magnitude. A resetting coil is also provided for returning the magnetic core to a predetermined magnetic condition by generating a predetermined magnetic field in the core in the same direction as the magnetic field generated by the current in the conductor.

---

This invention relates to current measuring devices for measuring current in a conductor and in particular to current measuring devices of the type which incorporate a clamp on probe requiring no mechanical or electrical connections to the current carrying conductor.

Several types of current measuring devices have heretofore been proposed for measuring the current in a conductor without mechanically connecting the measuring device to the conductor. These devices usually operate on magnetic principles whereby the magnetic field produced by the current in the conductor is sensed by the current measuring device to obtain an indication of the current in the conductor. To obtain this indication prior current measuring devices have employed split magnetic cores designed so as to permit surrounding the conductor with the magnetic core but have customarily employed energizing means for generating a predetermined magnetic field in the magnetic core and sensing means responsive to the interaction of the magnetic field generated by the current in the conductor with the magnetic field generated by the energizing means. Since these prior current measuring devices provide for continuously generating a magnetic field in the core they require and consume a considerable amount of power, which tends to preclude their usefulness as portable instruments, and usually are relatively complex and expensive.

This invention overcomes these and other disadvantages of the prior current measuring devices by providing a separable magnetic core comprised of first and second core sections which are normally held in a certain relative position so as to cause the magnetic core to present a certain reluctance to the magnetic field produced by the current in the conductor, adaptable for positioning in a different relative position so as to cause the magnetic core to present a different reluctance to the magnetic field, and operable to be returned at a predetermined rate to the certain position, thereby changing the magnetic flux in the magnetic core in accordance with the current in the conductor. Means for sensing the change in the magnetic flux in the magnetic core as an indication of the magnitude of the current in the conductor are also provided.

Accordingly, it is an object of this invention to provide a current measuring device employing a separable magnetic core having first and second core sections adapted for relative movement at a predetermined rate so as to change a magnetic field in the magnetic core in accordance with a current in a conductor.

It is a further object of this invention to provide a current measuring device which employs a separable magnetic core having first and second core sections adapted for surrounding a current carrying conductor and for relative movement therebetween at a predetermined rate so as to change a magnetic field in the magnetic core in accordance with the current in the conductor.

It is another object of this invention to provide a current measuring device which employs a separable magnetic core having first and second core sections adapted for surrounding a current carrying conductor and for relative movement at a predetermined rate so as to change a magnetic field in the magnetic core in accordance with the current in the conductor and a sensing coil responsive to the magnetic field in the magnetic core.

It is yet an additional object of this invention to provide a current measuring device which employs a separable magnetic core having first and second core sections adapted for relative movement therebetween at a predetermined rate so as to change a magnetic field in the magnetic core in accordance with a current in a conductor and resetting means for placing the magnetic core in a predetermined magnetic condition, thereby resetting the magnetic core for subsequent operation.

The foregoing and other objects of this invention will become apparent from the accompanying description and drawings, in which.

Figure 1:
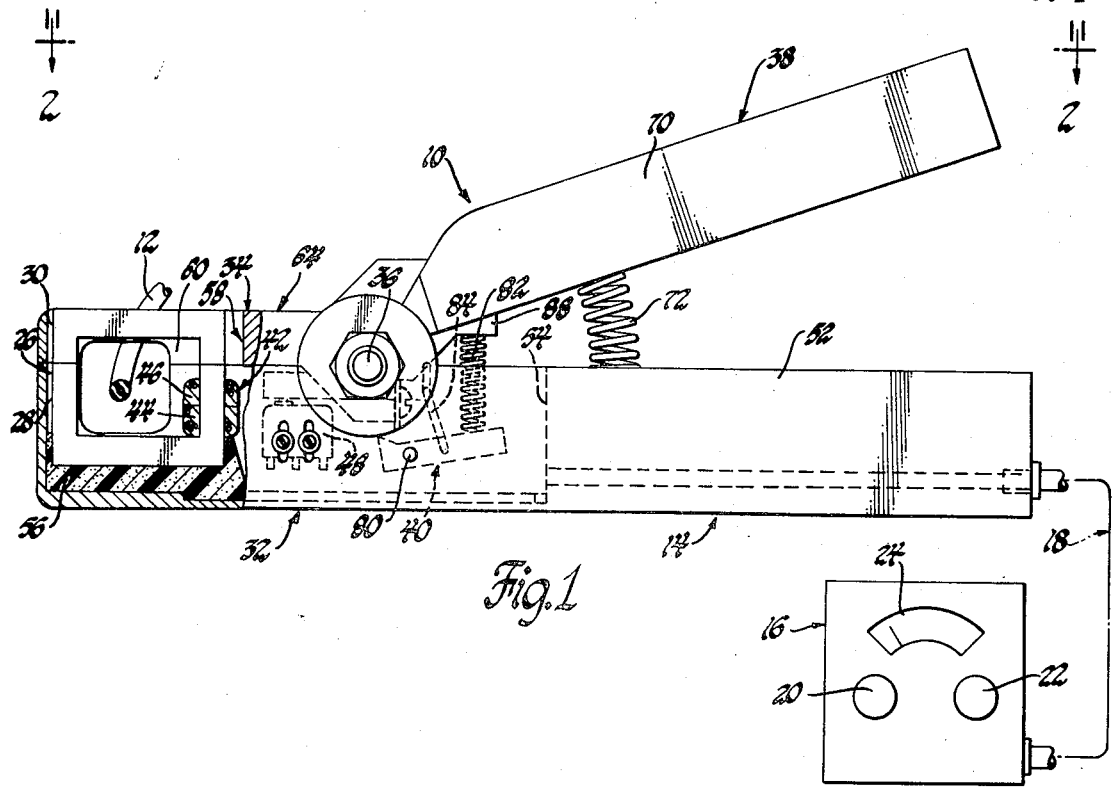
FIG. 1 illustrates a current measuring device embodying the principles of the subject invention.
Figure 2:
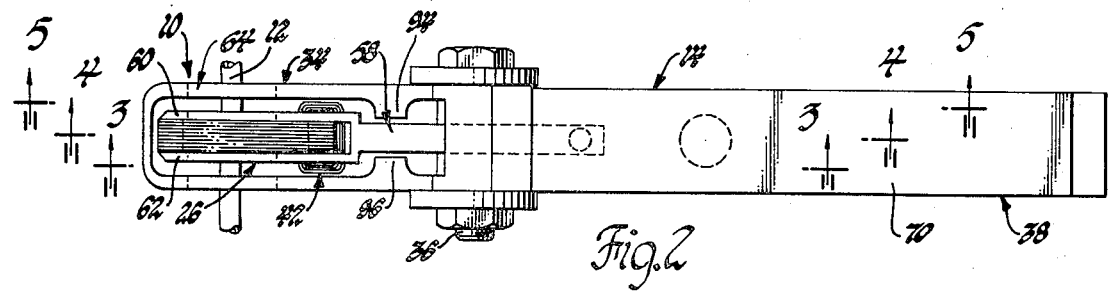
FIG. 2 is a plan view of the probe employed in the current measuring device illustrated in FIG. 1.
Figure 4A:
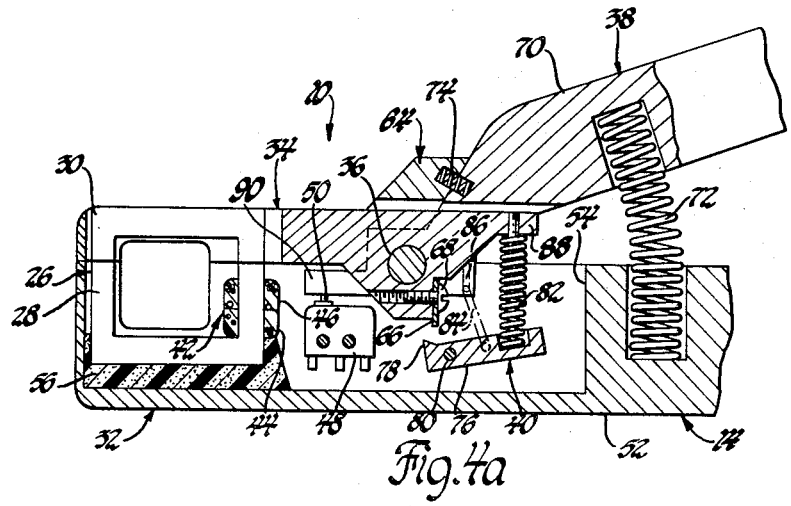
Figure 4B:
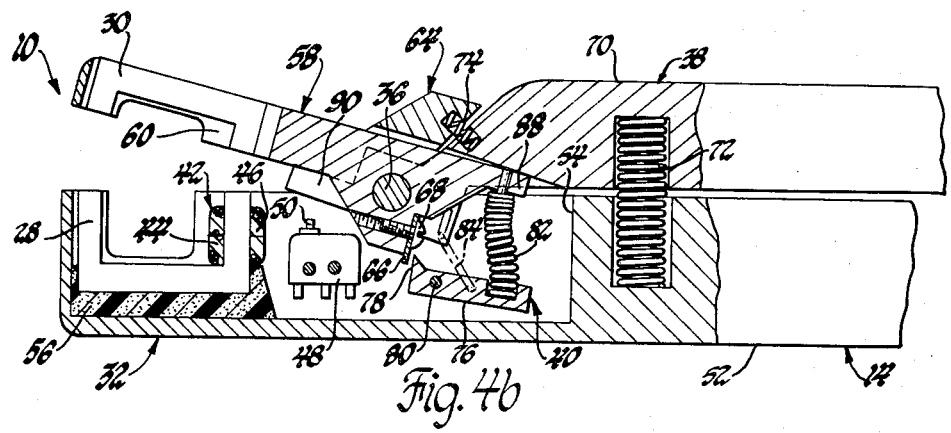
Figure 4C:
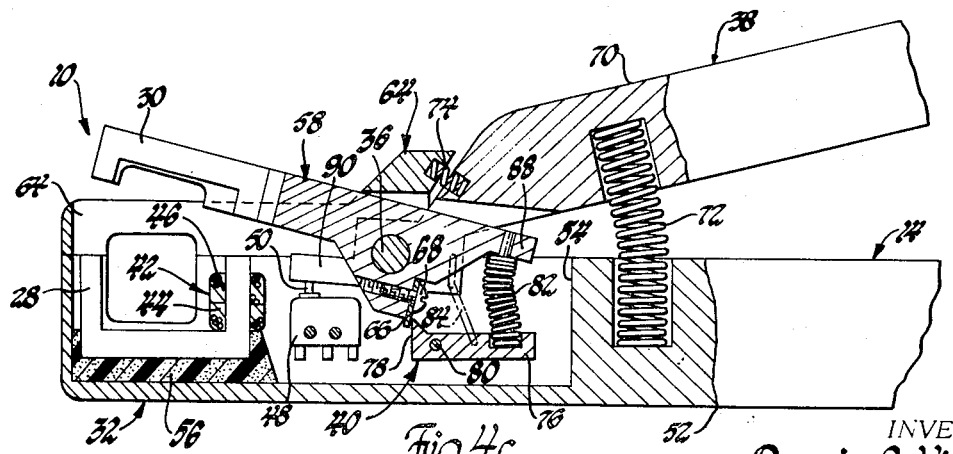

FIGS. 4(a), 4(b), and 4(c) are sectional views of the probe in FIG. 2 taken along the line 4—4, FIG. 5 is a sectional view of the probe in FIG. 2 taken along the line 5—5, FIG. 6 is a perspective view of the hammer employed in the probe illustrated in FIG. 1, FIG. 7 is a perspective view of the hammer housing in the probe illustrated in FIG. 1, FIG. 8 is a perspective view of the handle of the probe illustrated in FIG. 1, FIGS. 9(a) and 9(b) are voltage pulse waveforms generated by the probe in FIG. 1, and FIG. 10 is a schematic diagram of the circuitry employed in the meter illustrated in FIG. 1.

As is seen in FIG. 1, a clamp on current measuring device 10 is provided for measuring the current in a conductor 12. The current measuring device 10 includes a probe 14 and a meter 16 connected by a cable 18, which is comprised of a plurality of conductors. In the illustrated embodiment the probe 14 generates a voltage pulse proportional to the current in the conductor 12, which pulse is transmitted to the meter 16 through a conductor in the cable 18. While the meter 16 in the illustrated embodiment in FIG. 1 is provided with both green and red indicator lights 20 and 22 and a scale 24 for providing both a comparison of the current in the conductor 12 with a predetermined quantity and an indication as to the magnitude of the current, other current indicators responsive to a voltage pulse may be employed in place of the meter 16 to provide either one or both forms of indication, as will subsequently be explained in regard to FIG. 10.

The probe 14 is most clearly illustrated in FIGS. 2 through 8 and is comprised of a separable magnetic core 26 including first and second core sections 28 and 30 adapted for surrounding the conductor 12, a housing assembly 32 for housing the first core section 28, a hammer assembly 34 pivotally secured to the housing assembly 32 by a pin 36 for housing the second core section 30 and for moving the second core section 30 relative to the first core section 28, a handle assembly 38 for pivoting the hammer assembly 34 about the pin 36, a trigger assembly 40 having hold and release settings for holding the second core section 30 in a predetermined cocked position and for moving the second core section 30 at a predetermined rate relative to the first core section 28, a winding 42 including a sensing coil 44 for generating a voltage pulse proportional to the current in the conductor 12 and a resetting coil 46 for returning the magnetic core 26 to a predetermined magnetic condition, and a switch 48 including a plunger 50 which is depressed by the handle assembly 38 when the handle assembly 38 is released by the operator.

Figure 3:
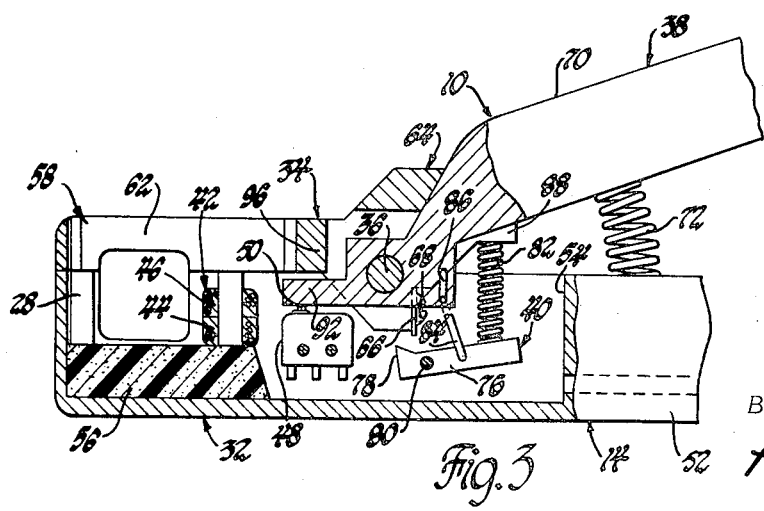
FIG. 3 is a sectional view of the probe in FIG. 2 taken along the lines 3—3.

As may be seen in FIGS. 3 through 5, the housing assembly 32 includes a housing 52 having a recess 54. The first core section 28 is secured to the housing 52 by placing it in a suitable potting compound 56 in the recess 54. By way of illustration and without limitation, the potting compound 56 may be comprised of "Flexane 85," a trademark of the Dev-con Corporation in Danvers, Mass., though other well-known potting compounds may be used.

The hammer assembly 34 includes a hammer 58, shown in perspective in FIG. 6, for housing the second core section 30 between a pair of tines 60 and 62. A hammer housing 64, most clearly illustrated in FIG. 7, surrounds the hammer 58 and is provided to serve as a guide for positioning the probe 14 relative to the conductor 12 prior to the measurement of the current in the conductor 12. The hammer assembly 34 also includes a trigger flange 66 secured to the hammer 58 by a screw 68 to provide a wear resistant and easily engageable surface for holding the hammer 58 in a predetermined cocked position, as will be later explained.

The separation of the first and second core sections 28 and 30 is achieved by operation of the handle assembly 38, which includes a handle 70, shown in perspective in FIG. 8, that is secured to the housing 52 by the pin 36. As seen in FIG. 4(a), the handle 70 is normally biased by a compressive spring 72 in a counterclockwise direction about the pin 36 so as to maintain the plunger 50 of the switch 48 depressed. In addition, the handle assembly 38 also includes a safety spring 74 for biasing the hammer housing 64 in a counterclockwise direction about the pin 36 relative to the handle 70 so as to fully surround the conductor 12 with the hammer housing 64 and the housing 52 prior to the release of the hammer 58 by the trigger assembly 40, thereby assuring that the hammer 58 does not strike and injure the conductor 12.

The trigger assembly 40 controls the release of the hammer 58 and includes a trigger 76 having an extension 78 formed therein to facilitate the engagement of the trigger flange 66 when the handle 70 is depressed to the position illustrated in FIG. 4(b). The engagement of the trigger flange 66 by the trigger 76 is facilitated by a pin 80 that secures the trigger 76 to the housing 52. The trigger 76 is biased in a clockwise direction about the pin 80 by a firing spring 82 that also biases the hammer 58 counterclockwise so as to maintain the second core section 30 in a certain position relative to the first core section 28. In the illustrated embodiment the firing spring 82 biases the second core section 30 into contact with the first core section 28 so as to minimize the reluctance which the magnetic core 26 presents to the magnetic field generated by the current in the conductor 12. The firing spring 82 continuously biases the hammer 58 and the trigger 76 apart but they are constrained by a connecting link 84 that is pivotally secured to the trigger 76 and slidably positioned in a slot 86 in the handle 70. The trigger 76 is thus supported by handle 70.

The operation of the probe 14 will now be explained. To clip the probe 14 on the conductor 12, as shown in FIG. 1, the handle 70 is depressed, as by squeezing the handle 70 and the housing 52, rotating the handle 70 clockwise about the pin 36 and compressing the spring 72, as illustrated sequentially in FIG. 4. As the handle 70 commences rotation the plunger 50 of the switch 48 is released but the hammer 58 and the hammer housing 64 remain at rest initially due to the biasing action of the springs 74 and 82. The second core section 30 is thus initially held in the certain position by the hammer 58. As the rotation of the handle 70 about the pin 36 continues the handle 70 contacts and depresses an end 88 of the hammer 58, causing the hammer 58 to rotate clockwise about the pin 36 with the handle 70. At substantially the same time as when this occurs the extensions 90 and 92 of the handle 70 contact a pair of projections 94 and 96 on the hammer housing 64, lifting the hammer housing 64 so as to rotate the hammer housing 64 clockwise about the pin 36 with the handle 70. The handle 70, the hammer 58, and the hammer housing 64 are thus rotated as a unit until the handle 70 is in the fully depressed potation of FIG. 4(b) and the second core section 30 is spaced sufficiently from the first core section 28 to allow the insertion of the conductor 12 in the magnetic core 26.

Once the conductor 12 has been surrounded by the magnetic core 26 the handle 70 is released by the operator and rotated counterclockwise about the pin 36 by the spring 72. The hammer housing 64, which is held against the projections 94 and 96 by the safety spring 74, is also rotated with the handle 70. However, inasmuch as the depressing of the handle 70 lowers the connecting link 84 sufficiently to allow the engagement of the trigger flange 66 of the trigger 76 by the extension 78 of the trigger 76, the hammer 58 is restrained by the trigger 76 when the handle 70 is released. As is seen in FIG. 4(c), the hammer 58 thus holds the second core section 30 in a predetermined cocked position. Since the hammer housing 64 is restrained only by the extensions 90 and 92 of the handle 70 and the safety spring 74, the hammer housing 64 is returned to its original position prior to the complete return of the handle 70 while the hammer 58 is held by the trigger 76. So long as the hammer 58 is in this position the magnetic core 26 presents a reluctance to the magnetic field generated by the current in the conductor 12 considerably greater than that presented when the second core section 30 is in the certain position.

When the handle 70 is rotated counterclockwise beyond the position illustrated in FIG. 4(c) the handle 70 pulls the connecting link 84 so as to release the trigger 76 by disengaging the extension 78 of the trigger 76 from the trigger flange 66. The trigger 58 is thus snapped counterclockwise due to the restoring force of the firing spring 82, which causes the hammer 58 and to return the second core section 30 to the certain position at a predetermined rate, thereby effecting a rapid change in the reluctance presented by the magnetic core 26 to the magnetic field produced by the current in the conductor 12. The changing reluctance of the magnetic core 26 causes a corresponding increase in magnetic flux through the magnetic core 26 and generates a voltage pulse in the sensing coil 44. Since the flux change in the magnetic core 26 and the number of turns in the sensing coil 44 are predetermined values, persons versed in the art will appreciate that the magnitude of the voltage pulse produced in the sensing coil 44 may be calibrated to be proportional to the current in the conductor 12.

In addition to releasing the trigger 58, counterclockwise rotation of the handle 70 from the position illustrated in FIG. 4(c) also results in depressing the plunger 50 of the switch 48, the firing spring 82 being selected so as to assure the return of the hammer 58 to the certain position prior to the closure of the switch 48. Since both the sensing coil 44 and the switch 48 are connected through the cable 18 to the meter 16, the meter 16 is thus provided with both a voltage pulse proportional to the current in the conductor 12 and a subsequent indication from the switch 48 that the test has been completed.

Referring now to FIG. 9, the waveform of the voltage pulse from the sensing coil 44, plotted against time, may be of two distinct types which are distinguishable by the meter 16. While various well-known meters responsive to voltage pulses may be employed as the meter 16, the apparatus illustrated in FIG. 10 has been found quite suitable in applications where it is important to detect whether the current in the conductor 12 is above a certain level.

As is seen in FIG. 10, the meter 16 may be comprised of first and second comparators 98 and 100, a voltage reference circuit 102 including a battery 104 and a potentiometer 106 having a wiper 107 for providing the first comparator 98 with a voltage reference, first and second NAND gates 108, and 110, a plurality of flip flops 112, 114, and 116 comprised of a plurality of NAND gates 118 through 123, the indicator lights 20 and 22 for indicating whether the current in the conductor is above a certain level, a monostable multivibrator 124 for providing a resetting pulse to the resetting coil 46 so as to return the magnetic core 26 to a predetermined magnetic condition, and a plurality of switches 125 through 127 for resetting the meter 16 and initiating the resetting pulse from the multivibrator 124.

In understanding the operation of the meter 16 it is convenient to establish some definitions. For example, logic information in the form of binary digits, or bits, is used in the meter 16, a "1" bit designating a DC voltage signal at other than ground potential and a "0" bit designating a DC voltage signal at ground potential. In addition, the comparators 98 and 100 are defined as devices which compare an input voltage with a reference voltage and generate a different binary output signal when the input voltage signal is below the reference voltage than when it is above the reference voltage. Also by way of definition, a NAND gate is defined as a device which generates a binary output in response to a plurality of binary inputs, the output being a "0" bit when all inputs are "1" bits and a "1" bit when any or all inputs are "0" bits. In addition, it should be noted that the two input NAND gates in the meter 16 are of the well-known type in which a floating, or open circuited, input assumes the potential of the other, closed, circuit input, causing the NAND gate output to be a "0" bit whenever the closed circuit input is a "1" bit.

The operation of the meter 16 will now be explained with reference to FIG. 10, in which the normal output signals of the various elements are illustrated as "1" or "0" bits. When the conductor 12 contains a current large enough to be detected the voltage pulse generated by the sensing coil 44 is similar to that illustrated to FIG. 9(a), in which the voltage pulse generated by the sensing coil 44 exceeds both a very low voltage level $V_1$, at which the second comparator 100 is set by connecting its reference input to ground, and an upper voltage level $V_2$, at which the first comparator 98 is set by connecting its reference input to the wiper 107 of the potentiometer 106. Accordingly, a voltage pulse which exceeds the upper voltage level $V_2$, as in FIG. 9(a), changes the state of the comparator 98 so as to energize the red indicator light 22 and changes the state of the second comparator 100 so as to operate the multivibrator 124, which sends a resetting voltage pulse through the resetting coil 46.

Referring now to FIG. 9(a), when the voltage pulse passes through the lower voltage level $V_1$ in a positive going direction at $t_1$, the second comparator 100 changes its output from a "1" bit to a "0" bit, causing the NAND gate 120 to change its output to a "1" bit, changing the NAND gate 121 output to a "0" bit because it has a floating input connected to the normally open switch 126. The changing of the comparator 100 and the NAND gate 120 outputs conditions the NAND gate 110 for a change in state should the input to the NAND gate 110 from the comparator 100 be returned to a "1" bit.

When the pulse in FIG. 9(a) passes through the second voltage level $V_2$ in a positive going direction at $t_2$ the first comparator 98 changes its output to a "1" bit so as to change the output of the NAND gate 108 to a "0" bit, changing the state of the NAND gates 118 and 119 so as to turn off the green indicator light 20 and turn on the red indicator light 22. The red indicator light 22 thus indicates to the operator that the second voltage level $V_2$ has been exceeded.

When the voltage pulse in FIG. 9(a) returns below the voltage level $V_2$ at $t_3$ the first comparator 98 again changes its state and returns the NAND gate 108 to its original condition. The red indicator light 22 remains energized, however, as the NAND gate 118 is supplied with a "1" bit input from the NAND gate 108 and a "0" bit input from the NAND gate 119.

As the voltage pulse in FIG. 9(a) returns below the first voltage level $V_1$ at point $t_4$ the second comparator 100 changes its output back to a "1" bit. When this occurs the state of the NAND gate 110 is changed as each of its inputs are provided with a "1" bit. This changes the state of the NAND gate 122, which changes the state of the NAND gate 123 so as to provide a "0" bit input to the multivibrator 124.

When the multivibrator 124 receives the "0" bit input from the NAND gate 123 it provides a resetting pulse to the reseting coil 46. The resetting pulse in the resetting coil 46 is selected so as to produce a magnetic field in the magnetic core 26 in the same direction as that generated by the current in the conductor 12. The magnetic core 26 is thus returned to a predetermined magnetic condition in which its residual flux assures its operation substantially along the outermost loop of its hysteresis curve regardless of the current in the conductor 12. While the amount of residual magnetism introduced in the magnetic core 26 by the pulse in the resetting coil 46 may be varied by adjusting the multivibrator 124, it has been found through practice that satisfactory performance may be obtained through use of a six volt resetting pulse lasting 30 microseconds.

After the resetting pulse has been applied to the reseting coil 46 the switches 125, 126, and 127 are closed so as to reset the flip flops 112, 114, and 116, respectively. The switches 125, 126, and 127 are closed automatically in the illustrated embodiment when the handle 70 is released by coupling them to the operation of the switch 48. As persons versed in the art will appreciate, various means may be employed to operate the switches 125, 126, and 127 in accordance with the switch 48. The respective switches may, for example, be ganged contacts physically positioned in the switch 48. In the alternative, the switch 48 may include a single set of contacts operative to control the switches 125, 126, and 127, which may be solid state devices located in the meter 16. Regardless of the type of switch employed, closure of the switches 125, 126, and 127 returns the NAND gates 119, 121, and 123 to their original condition by providing their respective inputs with a "0" bit. The meter 16 is thus made ready for a subsequent test.

As is seen in FIG. 9(b) a very low current in the conductor 12 may result in the generation of an output voltage pulse from the probe 14 which does not exceed the second voltage level $V_2$. When this occurs the first comparator 98 does not change its state and the green indicator light 20 remains energized. However, since the first voltage level $V_1$ is very low a voltage pulse of virtually any amplitude causes the second comparator 100 to change its output at point $t_1$ in FIG. 9(b) and conditions the NAND gate 110, as previously described. When the voltage pulse in FIG. 9(b) returns below the first voltage level $V_1$ at $t_2$ the comparator 100 is returned to its original condition and the state of the NAND gate 110 is changed so as to cause the multivibrator 124 to apply a resetting pulse to the resetting coil 46, as was also previously described. The magnetic core 26 is therefore returned to a predetermnied magnetic condition each time a test is performed regardless of the current in the conductor 12. Accordingly, an important advantage is attainable with the apparatus herein described as it provides returning the magnetic core 26 to a predetermined magnetic condition regardless of changes in the magnetic condition of the magnetic core 26 that may be introduced by extraneous magnetic fields, such as that produced by the earth, simply by pressing and releasing the handle 70 of the probe 14.

As persons knowledgeable in the art will appreciate, various modifications may readily be made in the subject apparatus. For example, the probe may readily be designed so as to rapidly separate the sections of the magnetic core, thereby increasing the reluctance at a sufficiently rapid rate to allow detecting a decreasing flux change in the magnetic core rather than detecting an increasing flux change. This and other modifications may be made in practicing the subject invention without departing from the spirit contained therein.

I claim:

1. A current measuring device for measuring current in a conductor comprising, in combination, a separable magnetic core having an initial magnetic condition and including first and second relatively movable core sections adapted for surrounding the conductor, means for positioning the second core section in a first predetermined position relative to the first core section so as to cause the magnetic core to present a certain reluctance to the magnetic field produced by the current in the conductor, selectively operable cocking means for moving the second core section to a second predetermined position relative to the first core section so as to change the reluctance presented by the magnetic core to the magnetic field, means for returning the second core member at a predetermined rate to the first predetermined position relative to the first core member so as to change the reluctance presented by the magnetic core to the magnetic field, thereby effecting a change in the magnetic flux in the magnetic core in accordance with the magnitude of the current in the conductor, sensing means responsive to the change in the magnetic flux in the magnetic core for indicating the magnitude of the current, means for generating a unidirectional resetting pulse, and a resetting coil responsive to the resetting pulse for placing the magnetic core in the initial magnetic condition.

2. A current measuring device for measuring current in a conductor comprising, in combination, a separable magnetic core having an initial magnetic condition and including first and second core sections adapted for relative movement therebetween so as to permit surrounding the conductor with the magnetic core, means for positioning the second core section in a first predetermined position relative to the first core section so as to cause the magnetic core to present a certain reluctance to the magnetic field produced by the current in the conductor, selectively operable cocking means for moving the second core section to a second predetermined position relative to the first core section so as to change the reluctance of the magnetic core in the magnetic field, means for returning the second core member at a predetermined rate to the first predetermined position so as to change the reluctance presented by the magnetic core to the magnetic field, thereby changing the magnetic flux in the magnetic core in accordance with the magnitude of the current in the conductor, sensing means including a sensing coil positioned so as to be responsive to the magnetic flux in the magnetic core for indicating the magnitude of the current in the conductor, resetting means responsive to the relative movement between the first and second core sections for generating a unidirectional resetting pulse, and a resetting coil responsive to the resetting pulse for placing the magnetic core in the initial magnetic condition.

3. A current measuring device for measuring current in a conductor comprising, in combination, a separable magnetic core having an initial magnetic condition and including first and second core sections adapted for relative movement therebetween so as to permit surrounding the conductor with the magnetic core, biasing means for biasing the second core section to a first predetermined position relative to the first core section so as to cause the magnetic core to present a certain reluctance to the magnetic field produced by the current in the conductor, selectively operable cocking means for cocking the second core section in a second predetermined position relative to the first core section so as to cause the magnetic core to present a different reluctance to the magnetic field, selectively operable means including trigger means having hold and release settings for maintaining the second core section in the second predetermined position when in the hold setting and for releasing the second core section when in the release setting so that the second core section is returned to the first predetermined position at a predetermined rate by the biasing means so as to change the magnetic flux in the magnetic core in accordance with the magnitude of the current in the conductor, sensing means responsive to the changing magnetic flux in the magnetic core for indicating the magnitude of the current, resetting means for generating a unidirectional resetting pulse, and a resetting coil responsive to the resetting pulse for placing the magnetic core in the initial magnetic condition.

4. A current measuring device for measuring current in a conductor comprising, in combination, a separable magnetic core having an initial magnetic condition and including first and second core sections adapted for relative movement therebetween so as to permit surrounding the conductor with the magnetic core, biasing means for biasing the second core section to a first predetermined position relative to the first core section so as to cause the magnetic core to present a certain reluctance to the magnetic field produced by the current in the conductor, selectively operable cocking means for cocking the second core section in a second predetermined position relative to the first core section so as to cause the magnetic core to present a predetermined reluctance to the magnetic field, selectively operable means including trigger means having hold and release settings for maintaining the second core section in the second predetermined position when in the hold setting and for releasing the second core section when in the release setting so that the second core section is returned to the certain position at a predetermined rate by the biasing means so as to change the magnetic flux in the magnetic core in accordance with the magnitude of the current in the conductor, sensing means including a sensing coil positioned so as to be responsive to the changing magnetic flux in the magnetic core for indicating the magnitude of the current in the conductor, resetting means responsive to the relative movement between the first and second core sections for generating a unidirectional resetting pulse, and a resetting coil responsive to the resetting pulse for placing the magnetic core in the initial magnetic condition.

References Cited

UNITED STATES PATENTS

| | | | |
|---|---|---|---|
| 3,465,250 | 9/1969 | Schilling | 324—127 |
| 2,345,430 | 3/1944 | Rich | 324—127 |
| 3,482,163 | 12/1969 | Peek et al. | 324—117 |
| 3,626,291 | 12/1971 | Yauch et al. | 324—127 |

RUDOLPH V. ROLINEC, Primary Examiner

E. F. KARLSEN, Assistant Examiner

U.S. Cl. X.R.

324—117 R